United States Patent [19]

Wood

[11] 4,156,319

[45] May 29, 1979

[54] FISHING ROD GUIDE

[76] Inventor: Hillyard D. Wood, 13 First St., Ocean City, N.J. 08226

[21] Appl. No.: 819,839

[22] Filed: Jul. 28, 1977

[51] Int. Cl.² ............................................. A01K 87/04
[52] U.S. Cl. ........................................................ 43/24
[58] Field of Search .............................. 43/24, 22, 23

[56] References Cited

U.S. PATENT DOCUMENTS

| | | | |
|---|---|---|---|
| 1,781,569 | 11/1930 | Cook | 43/24 |
| 2,227,868 | 1/1941 | Tengel | 43/24 |
| 3,171,228 | 3/1965 | Cwik | 43/24 |
| 4,011,680 | 3/1977 | Rienzo, Sr. | 43/24 |

FOREIGN PATENT DOCUMENTS 1132624  11/1968  United Kingdom ...................... 43/24

Primary Examiner—Harold D. Whitehead
Attorney, Agent, or Firm—Duffield & Lehrer

[57] ABSTRACT

A one piece guide frame is made from an injectable molded plastic material in an injection molding process. The frame includes a pair of spaced apart feet each of which has a pair of upstanding braces which terminate on either side of a guide ring holder. The guide ring holder has an open bottom and a recessed groove on the interior curved surface thereof. A preformed aluminum oxide ring is forced up through the opening in the bottom of the ring holder spreading the ring holder apart as it is forced there through. The oxide ring snaps into place within the recessed groove. The assembled guide is attached to a fishing rod using guide wrapping in the conventional known manner.

2 Claims, 4 Drawing Figures

U.S. Patent
May 29, 1979
4,156,319
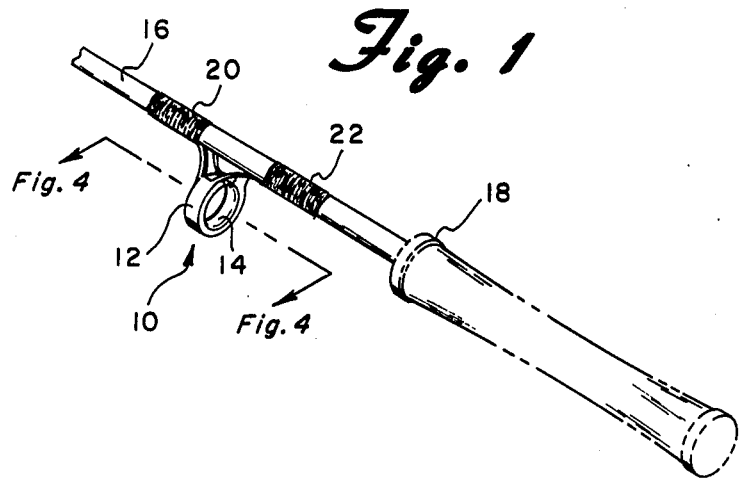
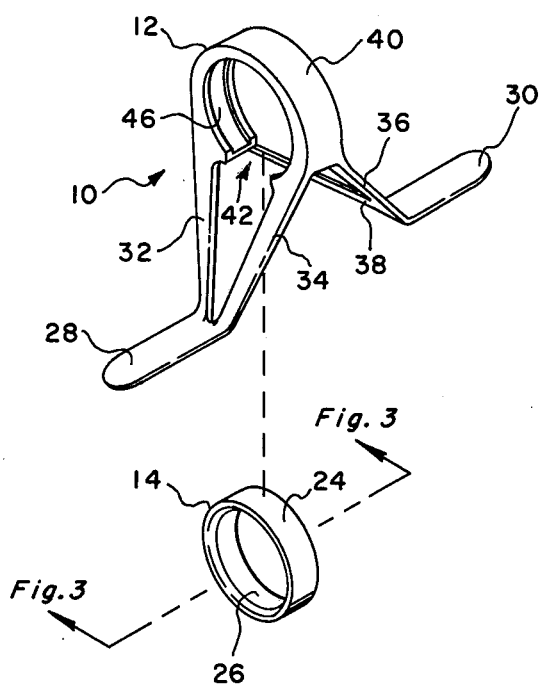
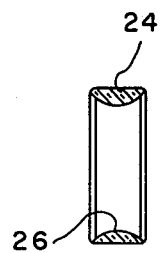
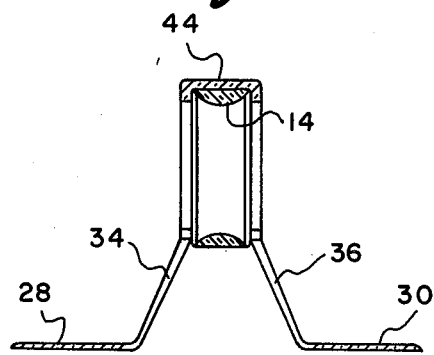

FISHING ROD GUIDE

BACKGROUND OF THE INVENTION

The present invention is directed toward a fishing rod guide and more particularly to a fishing rod guide which can be easily and inexpensively made from a one piece injected plastic guide frame and an aluminum oxide ring which snaps into the frame.

As is well known by those skilled in the art, fishing rod guides have been used for many years on fishing rods to guide the fishing line through the length of the rod. These have conventionally been made from a sheet of stock metal material which is first stamped and then bent to form feet and upstanding braces. A preformed metal ring was then attached to the braces from the underside thereof and a retaining shock absorbing ring of plastic material having an outside diameter slightly less than the inside diameter of the metal ring was inserted into the metal ring. An aluminum oxide ring is then fitted within the shock absorbing ring.

The above described conventional guide is relatively expensive to manufacture because of the various different parts which must be first made and then assembled. In addition, the parts are made from several different kinds of materials due to the fact that the aluminum oxide ring cannot be connected directly to the metal ring frame since a shock absorbing material must be interposed there between to protect the oxide ring.

SUMMARY OF THE INVENTION

The present invention overcomes the above described deficiencies of the prior art. This is accomplished by providing a one piece guide frame made from an injectable molded plastic material in an injection molding process. The frame includes a pair of spaced apart feet each of which has a pair of upstanding braces which terminate on either side of a guide ring holder. The guide ring holder has an open bottom and a recessed groove on the interior curved surface thereof. A preformed aluminum oxide ring is forced up through the opening in the bottom of the ring holder spreading the ring holder apart as it is forced there through. The oxide ring snaps into place within the recessed groove. The assembled guide is attached to a fishing rod using guide wrapping in the conventional known manner.

BRIEF DESCRIPTION OF THE DRAWINGS

For the purpose of illustrating the invention, there is shown in the accompanying drawings a form which is presently preferred; it being understood that the invention is not intended to be limited to the precise arrangements and instrumentalities shown.

FIG. 1 is a perspective view of a fishing rod guide constructed in accordance with the principles of the present invention and shown in use on a fishing rod;

FIG. 2 is an exploded perspective view of a fishing rod guide showing the two major components thereof;

FIG. 3 is a cross-sectional view taken along the line 3—3 of FIG. 2, and

FIG. 4 is a cross-sectional view taken along the line 4—4 of FIG. 1.

DETAILED DESCRIPTION OF THE PREFERRED EMODIMENT

Referring now to the drawings in detail wherein like reference numerals have been used throughout the various figures there of to designate like elements, there is shown in FIG. 1 a perspective view of a fishing rod guide constructed in accordance with the principles of the present invention and designated generally as 10.

Guide 10 is comprised essentially of two parts: a plastic guide frame 12 and an inner aluminum oxide ring 14. As shown in FIG. 1, guide 10 is secured to the rod section 16 of a fishing rod 18 by use of guide wrappings 20 and 22. The manner in which the guide 10 is secured to the rod section 16 and the use of the guide 10 are well known in the art and do not form a part of the present invention.

Referring now to FIG. 2, the guide 10 is shown in an exploded perspective view clearly illustrating the plastic guide frame 12 and the aluminum oxide ring 14 which are the two major components of the guide ring. The aluminum oxide ring 14 used with the present invention is a conventional ring which is known in the art. As shown in FIGS. 2 and 3, ring 14 preferably has a relatively flat outer circumference 24 and a curved inner circumference 26. The purpose of the oxide ring and particularly the curved inner circumference 26 is to reduce friction with and therefore wear of the fishing line as it passes through the guide 10. While the ring 14 is preferably made of aluminum oxide, it is known in the art that several other materials can be substituted therefor.

The guide frame 12 is preferably made from an injectable molded plastic material such as nylon or the like. This may be produced by any known injection molding process. Other types of molding processes may, of course, be possible. Preferably, the entire guide frame 12 as shown in FIG. 2 is made integrally in one piece in a single molding operation.

Referring again to FIG. 2 it can be seen that the guide frame 12 is comprised of a pair of feet 28 and 30 which extend outwardly away from each other but in substantially the same plane. Extending upwardly from one end of foot 28 are a pair of braces 32 and 34. Braces 32 and 34 taper away from each other as they move upwardly from foot 28 so as to have a substantially "V" configuration. In addition, braces 32 and 34 are not perpendicular to foot 28 but rather are angled away from the perpendicular so that the top of the braces 32 and 34 are spaced from the end of the foot 28 to which the braces are connected.

Braces 36 and 38 are similarly connected to foot 30 and are substantially identical in both design and orientation to braces 32 and 34. In other words, guide frame 12 is substantially symmetrical about a plane passing through the center thereof.

Connected to the top of each of the braces 32, 34, 36 and 38 is a guide ring holder 40. Ring holder 40 has a substantially circular cross-sectional configuration but is not a closed loop. Rather, it extends only approximately 300 degrees and therefore, has an open bottom shown generally at 42. Ring holder 40 preferably has a relatively smooth and flat outer surface 44. However, the inner circumference of ring holder 40 has a substantially rectangular groove 46 formed therein. Groove 46 extends throughout the entire inner circumference of the ring holder 40. As shown in FIG. 4, the width of the groove 46 is substantially identical to the width of the outer circumference of the aluminum oxide ring 14.

To complete the guide ring 10, it is only necessary to manually insert the aluminum oxide ring 14 into the groove 46 within the ring holder 40 of the guide frame 12. This is preferably accomplished by forcing the ring 14 up through the opening 42 in the bottom of the ring holder 40. As the ring 14 is forced upwardly, the lower portion of the ring holder 40 is forced open. Simultaneously, braces 34 and 36 on the one hand and 32 and 38 on the other move apart from each other. Eventually, if the ring 14 is continued to be moved upwardly, the lower portion of the ring holder 40 passes the midpoint of the ring 14 and the ring then snaps into place within the groove 46. The assembled guide 10 can then be affixed to the rod portion of a fishing rod in the known manner shown in FIG. 1.

It should be readily apparent that once the ring 14 is snapped into the groove 46, substantially the same amount of force is required to remove the same therefrom as was required to insert it. This amount of force is substantially more than would ever be exerted by a fishing line passing through the guide. Accordingly, for all intents and purposes the aluminum oxide ring 14 is locked into position within the ring holder 40. It could, however, be removed manually if desired.

As pointed out hereinabove, the entire guide frame 12 is comprised of a plastic material. Because of this, an additional shock absorbing ring to protect the aluminum oxide ring 14 is not necessary. Such shock absorbing rings were, however, needed with the prior art. The plastic material of the guide frame 12 provides sufficient shock absorbing properties.

The present invention may be embodied in other specific forms without departing from the spirit or essential attributes thereof and, accordingly, reference should be made to the appended claims, rather than to the foregoing specification as indicating the scope of the invention.

I claim:

1. In a fishing rod guide, a guide frame comprising a guide ring holder having a substantially circular circumference with an opening in said circumference adjacent the bottom of said holder, said guide ring holder including an inner circumference having a groove formed therein and extending throughout the said entire inner circumference; a pair of axially aligned feet for attaching said frame to a fishing rod, said feet extending in opposite directions and perpendicular to the plane of said guide ring holder; means connecting said feet to said ring holder adjacent said opening, said connecting means comprising a pair of braces extending upwardly from each of said feet, the upper ends of each pair of braces being connected to said ring holder at either side of said opening; said ring holder, said feet and said connecting means being composed of a plastic material and being integrally formed in one piece.

2. A fishing rod guide as claimed in claim 1 further including a guide ring, said guide ring having an inner and outer circumference, the width of said guide ring adjacent said outer circumference being substantially the same as the width of the said groove.

* * * * *